T. J. G. VAN EVERDINGEN.
LOCK NUT AND SCREW HEAD.
APPLICATION FILED NOV. 20, 1916.

1,234,830.

Patented July 31, 1917.

Inventor,
T. J. G. Van Everdingen
By Jno. Inuirs
Attorney

UNITED STATES PATENT OFFICE.

THEODORUS J. G. VAN EVERDINGEN, OF THE STEAMSHIP TASMAN, OF JAVA, DUTCH EAST INDIES.

LOCK-NUT AND SCREW-HEAD.

1,234,830.   Specification of Letters Patent.   Patented July 31, 1917.

Application filed November 20, 1916. Serial No. 132,492.

*To all whom it may concern:*

Be it known that I, THEODORUS JACOBUS GERARDUS VAN EVERDINGEN, administrator of the Royal Packet Navigation Company's steamship *Tasman*, a subject of the Queen of the Netherlands, domiciled on the said steamship *Tasman* and having a postal address at the office of the Royal Packet Navigation Company, of Weltevreden, in the city of Batavia, Java, in the Dutch East Indies, have invented certain new and useful Improvements in Lock-Nuts and Screw-Heads, of which the following is a specification.

This invention relates to nuts and screw heads used in connection with mechanical work and more particularly to that class of nut and screw used for railway, locomotive, marine and stationary engines and motor vehicles. Such nuts and screws have a tendency to slacken or work loose, due to vibration and the like, and the present invention has for its object to produce a nut which, when screwed in position will be prevented from slackening or turning back upon the threaded bolt or stud with which it is engaged, and a screw head which will not slacken or turn back from the metal with which it is engaged. Various devices have been employed in order that nuts and screws may be secured. The present invention has been designed to provide a cheap, simple and effective construction without attachments or parts liable to become deranged and which may be easily applied to existing as well as to new nuts and screws.

Referring to the drawings which form a part of this specification—

Figure 1:
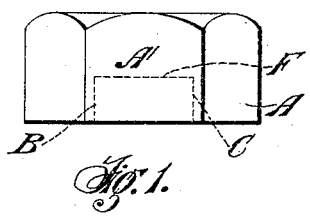
Figure 1 is an elevation of a nut according to this invention, showing in dotted lines, the position of a cavity therein.
Figure 2:
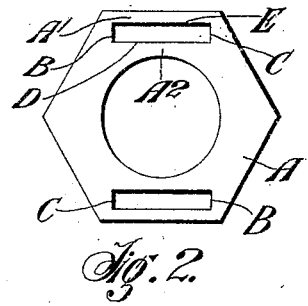
Fig. 2 is a view of the underneath side of a nut, according to this invention, showing a cavity of rectangular form.
Figure 7:
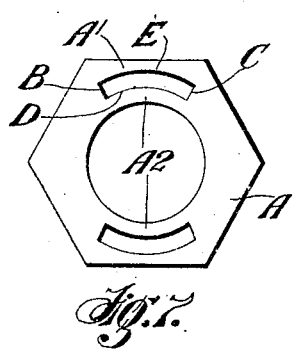
Fig. 7 is a view, according to this invention, of the underneath side of a modification of the nut in which two cavities of curved contour are shown.
Figure 8:
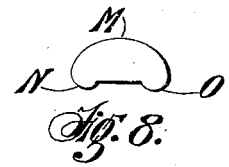
Fig. 8 is a side elevation.

The invention includes a metallic nut or screw head A of square, hexagon or other suitable shape in section. Formed in the underneath side of the nut or screw head A is a cavity. The cavity may be of rectangular shape as shown in Figs. 1 and 2, or it may be curved in contour as shown in Fig. 7. Preferably the cavity is midway between the outer wall $A^1$ and the inner wall $A^2$ of the nut. The cavity has a leading end marked B and a trailing end marked C. It also has an inside wall D, an outside wall E and a top F. The cavity may be formed in any suitable manner during the manufacture of the nut or screw head. If the invention is to be applied to existing nuts or screw heads the cavity may be formed by any suitable well known means.

Figure 3:
Fig. 3 is a side elevation of a rocking lever used in connection with the invention.
Figure 4:
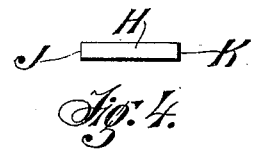
Fig. 4 is a plan of Fig. 3.
Figure 5:
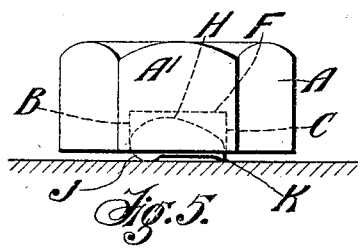
Fig. 5 is an elevation of a nut, according to this invention, in the position it assumes before being finally strained against the surface to which it is to be retained.

In combination with the nut A or screw head is used a rocking lever or lock having a crown H, a leading or rounded end J and a trailing end K with a depending sharpened edge. The rocking lever or lock is made of metal suitably hardened to the required degree. It freely fits within the cavity in which it is to be accommodated. Preferably it is of the form shown in Fig. 3 to engage the cavity shown in Figs. 1 and 2, but it may be of curved contour to engage the curved cavity shown in Fig. 7.

Figure 9:
Fig. 9 is a plan of an equalizer as used with the nut seen in Fig. 7.
Figure 10:
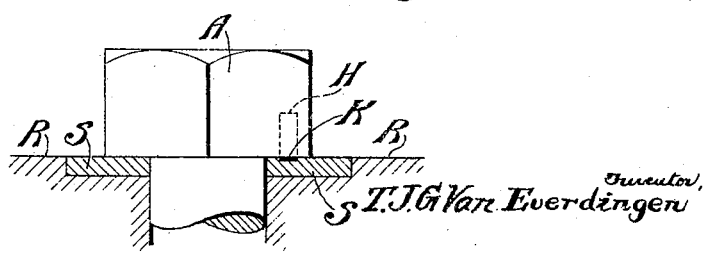
Fig. 10 is a sectional view of a screw head, according to this invention, in position above a removable washer sunk into a metallic face.

If desired an equalizer may be used in combination with the rocking lever G. The equalizer has a crown M, a rounded leading end N and a trailing end O. The contour of the equalizer will depend upon the shape of the cavity in which it is to be accommodated. If the cavity is of the form shown in Figs. 1 and 2 the equalizer is shaped accordingly. If it is to be accommodated by the curved cavity shown in Fig. 7 it is formed according to Fig. 9. The object of the equalizer is to prevent the nut from becoming distorted upon the bolt or stud and to assure its bedding flat upon the surface.

When a nut requires somewhat frequent removal the metal surface R is recessed and there is sunk into it a removable non-turning washer S. When the pathway of the rocking lever on the washers becomes abraded by the sharpened edge of the rocking lever the washer is removed and turned or another substituted.

Figure 6:
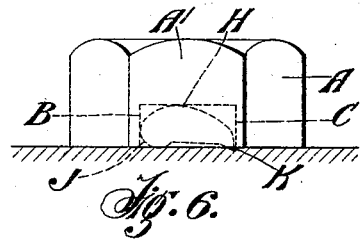
Fig. 6 is an elevation, according to this invention, of a nut in the position it assumes when strained against the surface to which it is locked.

In use a nut having a cavity according to this invention is applied to the threaded end of a bolt or stud. It is turned until in comparative close proximity to the face against which it is to be strained. A rocking lever G is then inserted in the cavity, the leading or rounded end J occupying the leading end of the cavity. Or the rocking lever may be inserted before the nut is applied to the bolt in which case it is retained in position by grease or by burring the walls D and E of the cavity. As the nut is further turned upon the thread the leading or rounded end J of the rocking lever G engages the metal face against which it is to be strained. By reason of its crown the rocking lever is permitted to partially rock in the cavity, the trailing end K of the lever readily following as the nut is strained. When the nut has been sufficiently tightened or strained upon the face against which it is to be retained the straining medium is removed. Should the threaded bolt or stud be subject to vibration or rattle or jar any tendency of the nut A to slacken is prevented by reason of the sharpened edge of the trailing end K of the rocking lever embedding itself into the metallic face as seen in Fig. 6. When it is necessary to remove the nut excessive pressure is exerted and the nut forcibly turned until the sharpened edge of the trailing end K of the rocking lever is disengaged. The nut is then removed in the ordinary way. If the equalizer is used it is inserted in the cavity at the same time as the rocking lever G.

The invention when applied to a screw head is used as described with reference to the nut.

It will be obvious that the invention is positive in action and does not contain any parts liable to become deranged, and that a series of cavities and rocking levers may be used in a nut or screw head according to requirements.

Having now described my invention what I claim as new and desire to secure by Letters Patent is:—

1. A lock nut or screw head having a cavity in the underneath side thereof, a tiltable lock seated in said cavity, said lock having its lower leading edge and the opposite edge projected downwardly below the level of the bottom of the body portion of said lock, one of the projected edges being sharpened whereby when the nut or screw head is tightened the top wall of the cavity will engage the top of the lock and force the sharpened projected edge into the surface on which it engages.

2. A lock nut or screw head having a cavity in the underneath side thereof, a tiltable lock seated in said cavity, the top of the lock being curved upwardly to form a crown and one lower end being rounded and its opposite end being projected below the bottom of the lock and sharpened, whereby when the nut or screw head is tightened the top wall of the cavity will engage the crown and force the sharpened projected edge into the surface on which it engages.

3. A lock nut or screw head having a curved cavity in the underneath side thereof, the curvature being struck from the axis of the nut or screw head, a curved tiltable lock seated in said cavity, said curved lock having its lower leading edge rounded and its opposite edge projected beyond the bottom of the lock and sharpened, whereby when the nut or screw head is tightened the top wall of the cavity will engage the top of the lock and force the sharpened projected edge into the surface on which it engages.

4. A lock nut or screw head having cavities disposed opposite each other in the underneath side thereof, on one end a depending rounded portion and its opposite end being provided with a lock seated in one of the cavities, said lock having on one end a depending rounded portion and its opposite end being provided with a sharpened projected edge, and an equalizer seated in the other cavity, the top walls of the cavities engaging the tops of the lock and the equalizer when the nut or the screw head is tightened to force the sharpened projected edge into the surface on which it bears, the equalizer preventing the twisting of the head when the edge of the lock is forced into locking position.

5. A lock nut or screw head having a cavity in the underneath side thereof, a tiltable lock seated in said cavity, said lock having a rounded leading end and a depending sharpened edge, in combination with a removable washer held in fixed position in a recess in the face against which the nut is to be strained, the top of the cavity engaging the top of the lock and thereby forcing the sharpened projecting edge of the lock into the face of the washer when the nut or screw head is tightened.

6. A lock nut or screw head having a cavity in the underneath side thereof, a tiltable lock seated in said cavity, said lock having a rounded leading end, and a depending sharpened edge, the rounded edge and the sharpened edge extending below the level of the bottom of the body portion of said lock, whereby when the nut or screw head is tightened the top wall of the cavity will engage the top of the lock and projecting edges against the adjacent surface and when the direction of movement of the nut or screw is reversed the sharpened depending edge grips the surface on which it fits.

7. A lock nut or screw head having cavities in the underneath side thereof, tiltable locks seated in the cavities, each of said locks having its top rounded to form a crown and having a rounded leading edge and a sharpened trailing edge, the latter penetrating the surface when the nut moves in a reverse direction, the rounded leading edge and the sharpened edge depending below the level of the bottom portion of the lock, whereby when the nut or screw head is tightened the top walls of the cavities will engage the crowns and force the sharpened edges into contact with the adjacent surface.

In testimony whereof, I affix my signature.

T. J. G. VAN EVERDINGEN.

Copies of this patent may be obtained for five cents each, by addressing the "Commissioner of Patents, Washington, D. C."